United States Patent Office 3,377,906
Patented Apr. 16, 1968

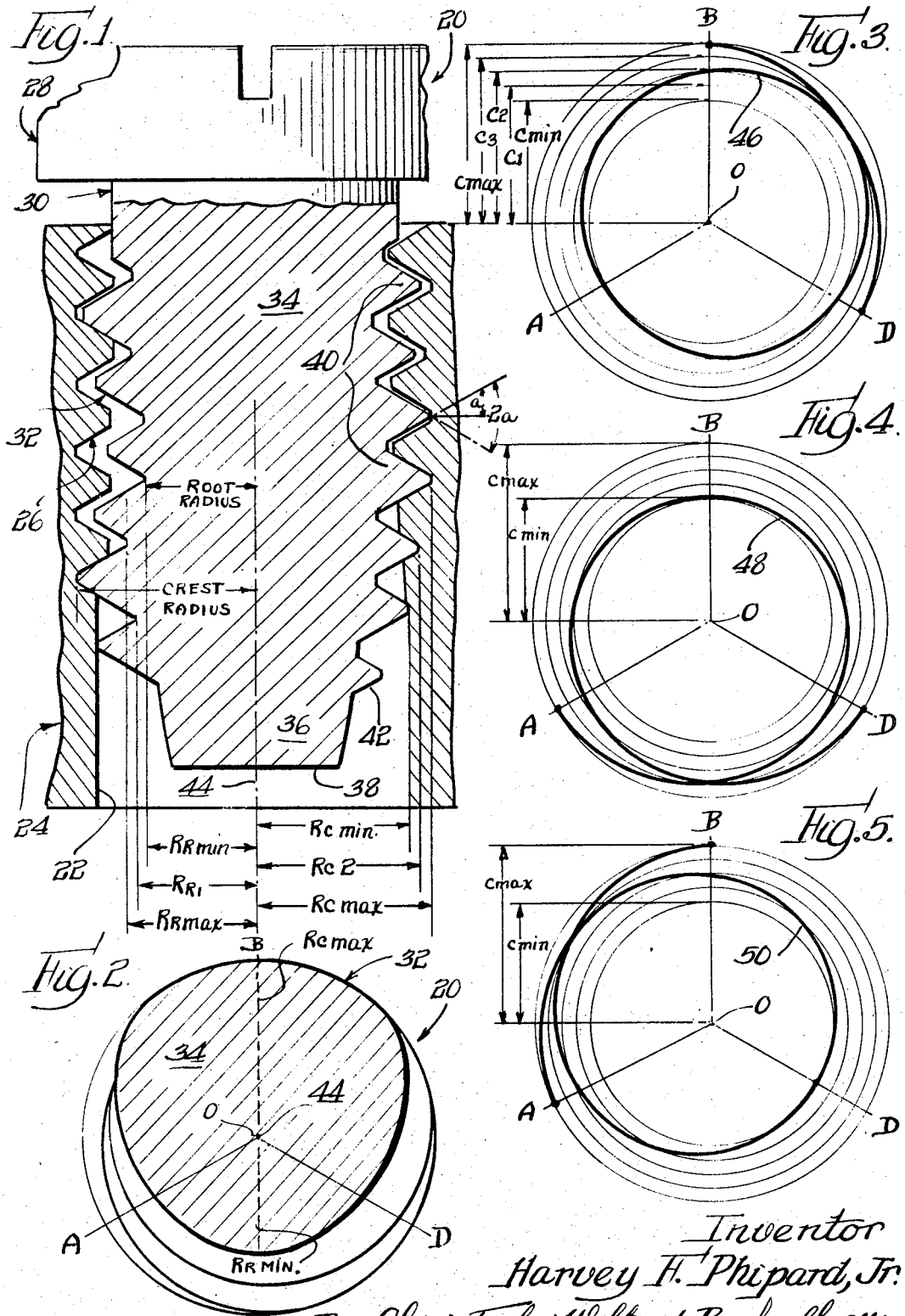

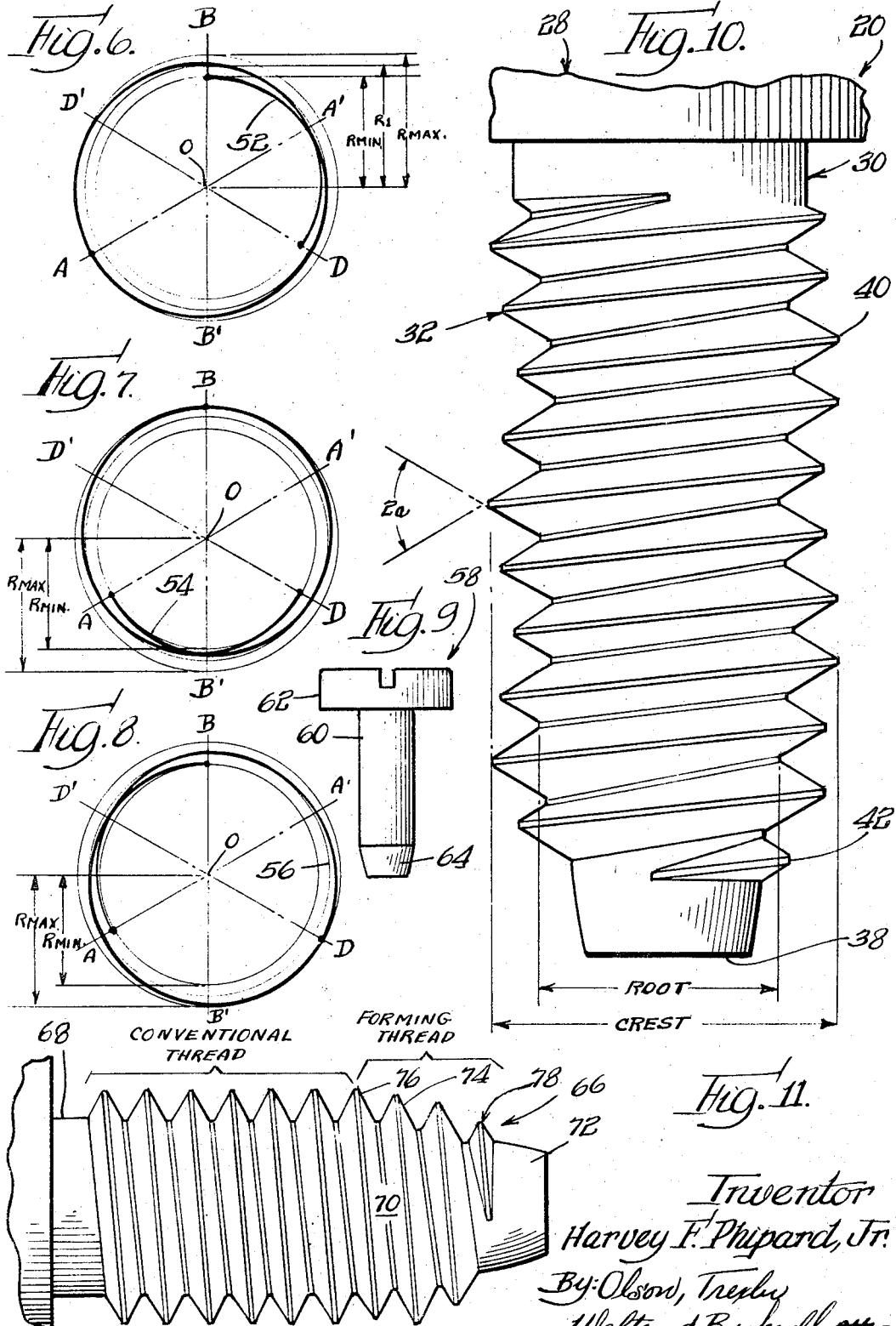

3,377,906
THREAD-FORMING TOOL
Harvey F. Phipard, Jr., South Dartmouth, Mass., assignor to Research Engineering and Mfg., Inc., New Bedford, Mass., a corporation of Massachusetts
Filed May 2, 1966, Ser. No. 546,884
8 Claims. (Cl. 85—46)

ABSTRACT OF THE DISCLOSURE

A thread-forming tool which comprises a spindle and a continuous thread on the spindle. The continuous thread of the invention has a constant included angle throughout its length, the radial distance from the longitudinal axis of the spindle to the crest of the thread varying cyclically between selected maximum and minimum values. The successive maximum values of the aforesaid radial distance are spaced angularly by $$\left(2+\frac{n}{3}\right)\pi \text{ radians}$$

wherein $n$ is a number from 1 to 2.

---

This invention relates generally to thread-forming tools and more particularly to tools for forming an internal screw thread. In one specific aspect, the present invention relates to a self-tapping screw.

Tools for forming an internal screw thread are generally classified either as taps that thread a previously drilled or punched hole to receive a separate, externally threaded fastener or as self-tapping screws that develop a mating thread in their own receiving aperture. Both types of tools may be further distinguished on the basis of whether they form the thread by displacing material at the wall of the bore or whether they merely remove material therefrom. The latter type of tool is objectionable because it generates contaminating chips and because it requires substantial driving torque.

A general object of the present invention is to provide a new and improved self-tapping screw of the type which displaces the material of the receiving bore.

Another object of the invention is to provide a self-tapping screw of the aforesaid type which establishes itself in the receiving bore in tightly anchored relationship.

Still another object of the invention is to provide a swaging type of self-tapping screw which requires a minimum driving torque.

These and other objects and features of the invention will become more apparent from a consideration of the following descriptions.

In order that the principles of the invention may be readily understood, two embodiments thereof, applied to a screw fastener but to which the application is not to be restricted, are shown in the accompanying drawings wherein:

FIG. 1 is a central cross-sectional view of a screw fastener constructed in compliance with the present invention and shown forming an internal thread in the walls of a cylindrical, receiving bore;

FIG. 2 is a transverse sectional view of the screw fastener of FIG. 1;

FIGS. 3, 4 and 5 are diagrammatic views illustrating the variation in the crest projection of the thread provided on the screw fastener of FIG. 1;

FIGS. 6, 7 and 8 are diagrammatic views illustrating the variation in the root projection of the screw fastener of FIG. 1;

FIG. 9 is an elevational view on a reduced scale of a screw blank used in forming the screw fastener of FIG. 1;

FIG. 10 is an enlarged elevational view of the resultant screw fastener; and

FIG. 11 is an elevational, intermediate scale view showing a modified form of the screw fastener of the invention.

Referring now in detail to the drawings, specifically to FIG. 1, a screw fastener 20 constructed in compliance with the invention is shown turned into a previously prepared bore 22 that has been formed in a metal body or workpiece 24, the screw fastener 20 swaging an internal thread 26 at the wall of bore 22 as it penetrates therein.

The screw fastener 20 comprises a head 28 of a suitable tool-engageable shape, a spindle 30 and a spiral thread 32 of uniform pitch that is carried on the spindle 30. The spindle itself comprises a cylindrical body portion 34 and a tapering tip portion 36 which may, if desired, be truncated to form a flat entering end 38. In order that the fastener 20 may both form the internal thread 36 and become seated in that internal thread, the continuous, external thread 32 which is carried by the spindle 30 includes a plurality of helical turns 40 on the body portion 34 and at least part of a spiral turn 42 on the tapering tip portion 36. The continuous thread 32 is arranged to take a flank angle $a$ which is, of course, one-half of the included angle of the thread; and in compliance with the features of the present invention, the included angle of the thread 32 is constant throughout the length thereof. Advantageously, both the crest and the root of thread 32 are truncated.

The spindle 30 has a longitudinal axis 44; and in compliance with the features of the present invention, the distance from the longitudinal axis 44 to the crest of the thread 32 varies cyclically between selected maximum and minimum values. In FIG. 1, the maximum crest radius of the illustrated screw fastener 20 is represented by the dimension $R_c$ max.; the minimum crest radius is shown as the dimension $R_c$ min.; and an intermediate value as shown by the quantity $R_{c2}$. The maximum crest radius is also shown in FIG. 2 where it coincides with a radial construction line OB, the origin O of the latter line being coincident with the longitudinal axis 44 of screw fastener 20. Construction lines OA and OD also originate at the axis 44 and are spaced respectively on opposite sides of the line OB at an angular distance of $\frac{2}{3}\pi$ radians therefrom.

The construction of a particular cycle of variation for the crest radius of thread 32 is illustrated in FIGS. 3–5. There the construction lines OB, OA and OD are laid out as datum or reference lines. A number of concentric circles are drawn in FIGS. 3, 4 and 5 with the longitudinal axis of the screw fastener, represented by the origin point O, as their center. The radii of these respective concentric circles correspond to the maximum crest radius, the minimum crest radius and three intermediate values of the crest radius. A spiral line 46 in FIG. 3 represents one cycle in the trace of thread 32 from a maximum radius value originating at line OB and passing successively through lines OD, OA, OB and terminating again at a maximum radius value at line OD. During the course of this trace, the spiral line 46 passes through a minimum radius value at the line OA, intersecting itself between the lines OB and OD in order to return to the maximum radius value from which it originated. The trace thus represented by the spiral line 46 varies gradually in accordance with the formula of an Archimedean spiral and traverses a full cycle of variation between respective maximum radius values in traversing an angular distance of $\frac{8}{3}\pi$ radius.

A second complete cycle of variation in the crest radius of thread 32 is represented by the line 48 in FIG. 4 which line begins at the intersection of the circle of maximum radius and the construction line OD where line 46 terminated, line 48 continuing through one complete cycle in an Archimedean spiral to terminate at the maximum crest radius circle where it intersects the construction line OA. A third complete cycle of variation is shown in FIG. 5 by the spiral line 50 which originates at the point of termination of line 48 and continues in a like manner through an Archimedean spiral, traversing an angular measure of $\frac{8}{3}\pi$ radians to terminate at the intersection of line OB and the circle representing the maximum crest radius. Whereas, in the embodiment disclosed in FIGS. 1–5, the radius, i.e., radial distance between the longitudinal axis 44 and the crest projection, varies between maximum values which are spaced angularly by $\frac{8}{3}\pi$ radians, the present invention contemplates that successive maximum values of the crest radius shall be spaced angularly by $$\left(2+\frac{n}{3}\right)\pi \text{ radians}$$

wherein $n$ is a number from 1 to 2.

In compliance with a feature of the invention, the maximum crest radius is arranged to take an angular phase relationship of $\pi$ radians with respect to the minimum root radius. This is shown in FIG. 2 where $R_c$ max., the maximum root radius, lies on the line OB whereas $R_r$ min., the minimum root radius, lies on the diametric projection of the line OB. This relationship will also be apparent from a comparison of FIGS. 3–5 which show the generation of the crest of the thread and FIGS. 6–8 which represent the generation of the root of the thread.

In FIGS. 6–8, the construction lines OB, OD and OA are supplemented by their respective diametric projections, namely the construction lines OB', OD' and OA'. The concentric circles shown represent various root radii including $R_{min.}$, corresponding to the minimum root radius, $R_{max.}$, the maximum root radius, and $R_1$, representing an intermediate root radius. The root radius, i.e., the radial distance from the longitudinal axis 44 upon which the point O lies to the root of the thread 32, varies cyclically between selected maximum and minimum values. An inspection of FIGS. 6–8 reveals that, in the embodiment thus far described, successive minimum values of the root radius are spaced angularly by $\frac{8}{3}\pi$ radians. Thus, in FIG. 6, a line 52 representing the root radius traces from a point of origin lying at the intersection of line OB and the circle whose radius is $R_{min.}$ through a maximum value at the intersection of line OA and the circle whose $R_{max.}$ to return to a minimum value again at line OD. Continuation of the line 52 is shown successively in FIGS. 7 and 8 by lines 54 and 56 respectively. Comparing FIGS. 6–8 with FIGS. 3–5 bears out the previously described phase relationship between the crest radius and the root radius of the continuous thread 32. Correspondingly, successive minimum values of the root radius are, in compliance with the features of the invention, spaced angularly by $$\left(2+\frac{n}{3}\right)\pi \text{ radians}$$

where $n$ is a number from 1 to 2.

The swaging-type, self-tapping screw fastener of the present invention is conveniently made from a screw blank 58, shown in FIG. 9, using a roll thread die. The blank 58 is ordinarily fashioned from low carbon steel in order to facilitate formation of the thread; and as is shown in FIG. 9, the blank 58 comprises a cylindrical shank 60 which is situated between a suitably shaped head 62 and frusto-conical tip 64. Because of the constant included angle of the thread to be formed on the shank 60 and the tip 64, the roll thread die employed for this purpose is itself fabricated with comparative ease. This ease of die fabrication does not always obtain with threading tools that work by a swaging action. After the thread is rolled, the screw blank 58 is case hardened using conventional techniques.

The general external appearance of screw fastener 20 is shown in FIG. 10; and from an examination of FIG. 2, it will be appreciated that the thread 32 is generally lobular in configuration.

Returning to FIG. 1, it has been found that any given spot on the wall of bore 22 is worked with every advancing turn of the screw fastener 20, even after one complete cycle of the crest projection has passed that point. This almost constant working of the metal of the receiving stock causes the screw fastener to fit very snugly into the bore 22, producing a very tightly anchored mounting. The mounting achieved is therefore highly resistant to backing out of the screw fastener under conditions of repeated shock or vibration. Furthermore, the gradually spiraling character of the crest and root projections, taking more than one full circle of revolution to complete a cycle of variation, promotes relative ease of entry of the screw fastener into the stock of the receiving piece.

Where a self-tapping screw fastener having an even lower driving torque is desired, the screw fastener of the invention is arranged in compliance with the showing in FIG. 11. There, a screw fastener 66 comprises a suitably shaped head 68, a cylindrical shank or spindle 70 and a tapering tip 72. In specific compliance with the invention, the screw fastener 66 includes a continuous thread 74 on the spindle 70, which thread has a constant included angle throughout its length and which has a cyclically varying crest projection similar to that of screw fastener 20. However, the thread 74 is characterized by including only one full cycle of crest and root variation. The thread 74 merges into a conventional screw thread 76 in the direction of head 68 and with at least a part of a spiral turn of cyclically varying thread 78 on its tip portion. Screw thread 76 is conventional in that it has a constant crest radius and a constant root radius.

While particular embodiments of the invention have been shown and described, it should be understood, of course, that the invention is not limited thereto since many modifications may be made. It is, therefore, contemplated to cover by the present application all such modifications as fall within the true spirit and scope of the appended claims.

The invention is set forth as follows:

1. A tool for forming an internal screw thread comprising: a spindle and a continuous thread on said spindle, said thread having a constant included angle throughout its length and the radial distance from the longitudinal axis of said spindle to the crest of said thread varying cyclically between selected maximum and minimum values, successive maximum values of said radial distance being spaced angularly by $$\left(2+\frac{n}{3}\right)\pi \text{ radians}$$

wherein $n$ is a number from 1 to 2.

2. A tool according to claim 1 wherein said spindle includes a cylindrical body portion and a tapering tip portion and wherein said continuous thread includes a plurality of helical turns on said body portion and at least part of a spiral turn on said tip portion.

3. A tool according to claim 2 wherein the helical turns of said thread have a substantially uniform pitch throughout the length of said body portion.

4. A tool according to claim 1 wherein the radial distance from the longitudinal axis of said spindle to the root of said thread varies cyclically between selected maximum and minimum values, successive minimum values of said radial root distance being spaced angularly by $$\left(2+\frac{n}{3}\right)\pi \text{ radians}$$

wherein $n$ is a number from 1 to 2.

5. A tool according to claim 4 wherein the maximum radial crest distance bears an angular phase relationship of $\pi$ radians with the minimum radial root distance.

6. A tool for forming an internal screw thread comprising: a spindle and a continuous thread on said spindle, said thread having a constant included angle throughout its length and said thread including a first, entering end portion and a second, following portion, the radial distance from the longitudinal axis of said spindle to the crest of said second portion being substantially constant and the radial distance from the longitudinal axis of said spindle to the crest of said first thread portion varying cyclically between selected maximum and minimum values, successive maximum values of said last mentioned radial distance being spaced angularly by $$\left(2+\frac{n}{3}\right)\pi \text{ radians}$$

wherein $n$ is a number from 1 to 2.

7. A tool according to claim 6 wherein the radial distance from the longitudinal axis of said spindle to the root of said first thread portion varies cyclically between selected maximum and minimum values, successive minimum values of said radial root distance being spaced angularly by $$\left(2+\frac{n}{3}\right)\pi \text{ radians}$$

wherein $n$ is a number from 1 to 2.

8. A tool according to claim 7 wherein the maximum radial crest distance bears an angular phase relationship of $\pi$ radians with the minimum radial root distance.

References Cited

UNITED STATES PATENTS

| 440,334 | 11/1890 | Rogers | 85—48 |
| 2,093,172 | 9/1937 | Olson | 85—47 |
| 2,160,706 | 5/1939 | Olson | 85—47 |
| Re. 24,572 | 12/1958 | Welles | 85—46 |
| 3,180,202 | 4/1965 | Kahn | 85—46 |
| 3,246,556 | 4/1966 | Phipard | 85—46 |

FOREIGN PATENTS 957,675   4/1964   Great Britain.

MARION PARSONS, JR., *Primary Examiner.*

UNITED STATES PATENT OFFICE
CERTIFICATE OF CORRECTION

Patent No. 3,377,906  April 16, 1968

Harvey F. Phipard, Jr.

It is certified that error appears in the above identified patent and that said Letters Patent are hereby corrected as shown below:

Column 2, line 67, "radius" should read -- radians --.
Column 3, line 10, "the radius" should read -- the crest radius --.

Signed and sealed this 9th day of September 1969.

(SEAL)
Attest:

Edward M. Fletcher, Jr.
Attesting Officer

WILLIAM E. SCHUYLER, JR.
Commissioner of Patents